United States Patent [19]
Garner

[11] 3,943,763
[45] Mar. 16, 1976

[54] MAGNETIC HEADING REFERENCE

[75] Inventor: Howell D. Garner, Newport News, Va.

[73] Assignee: The United States of America as represented by the United States National Aeronautics and Space Administration Office of General Counsel-Code GP, Washington, D.C.

[22] Filed: Dec. 11, 1974

[21] Appl. No.: 531,647

[52] U.S. Cl. .............................. 73/178 R; 33/356
[51] Int. Cl.² ........................................ G01C 21/00
[58] Field of Search ...................... 33/356, 357, 358; 73/178 R, 178 T

[56] References Cited
UNITED STATES PATENTS
2,998,727   9/1961   Baker .................................... 33/356

*Primary Examiner*—Donald O. Woodiel
*Attorney, Agent, or Firm*—Howard J. Osborn; William H. King; John R. Manning

[57] ABSTRACT

This invention employs a magnetometer as a magnetic heading reference for a vehicle such as a small aircraft. The magnetometer is mounted on a directional dial in the aircraft in the vicinity of the pilot such that it is free to turn with the dial about the yaw axis of the aircraft. The invention includes a circuit for generating a signal proportional to the northerly turning error produced in the magnetometer due to the vertical component of the earth's magnetic field. This generated signal is then subtracted from the output of the magnetometer to compensate for the northerly turning error.

6 Claims, 16 Drawing Figures

MAGNETOMETER ORIENTATION

MAGNETIC HEADING REFERENCE

ORIGIN OF THE INVENTION

The invention described herein was made by an employee of the U.S. Government and may be manufactured and used by or for the Government for governmental purposes without the payment of any royalties thereon or therefor.

BACKGROUND OF THE IVNENTION

The invention relates generally to heading references for vehicles such as an aircraft and more specifically concerns an improved magnetometer for use as a heading reference for an aircraft.

Conventionally, when magnetometers are used as heading references in aircraft, they are mounted in some remote part of the aircraft as far away as possible from such magnetic anomalies as the engine and the electrical system. Although this is a laudable procedure, it requires at least two magnetometers at the remote location and some type of signal resolver on the pilot's control panel to allow course changes to be made. It is therefore an object of this invention to use a single magnetometer within reach of the pilot so that he can make course changes simply by rotating the magnetometer with respect to the aircraft.

The earth's magnetic field lies parallel to the earth's surface only at the magnetic equator, corresponding roughly to the geographic equator, and becomes vertical at the two magnetic poles. Within the United States, the direction of the field varies from about 60° to 75° from the horizontal. If a magnetic sensing element is used in the strapped-down mode its angular relation to the vertical component of the earth's field will change when an aircraft executes a banked turn and under certain conditions intolerable errors in the output of the sensor will occur. This effect for the conventional magnetic compass is called "northerly turning error" and can, at worst, result in an indicated turn in the opposite direction to that actually being made.

In conventional autopilot designs in which a magnetometer heading reference has been used, the difficulty of the northerly turning error has been avoided either by stabilizing the magnetometer element with a free gyro so that it remains in a horizontal plane despite any banking of the aircraft, or by combining the magnetometer with a free directional gyro. For the combination the free directional gyro is used as the heading reference of the autopilot, and the output of the magnetometer is used to monitor the drift of the gyro so that it may be corrected, either manually or automatically, during level flight. Both of these approaches are high-cost approaches and are not highly reliable. It is therefore the primary object of this invention to provide a simple, low-cost highly reliable means for compensating for the northerly turning error in a magnetometer used as a heading reference for a vehicle such as an aircraft.

SUMMARY OF THE INVENTION

A magnetometer is mounted on a directional dial within easy reach of the pilot. The directional dial and magnetometer are free to rotate about an axis parallel to the yaw axis of the aircraft and the longitudinal axis of the magnetometer is perpendicular to this axis.

The output of the magnetometer is proportional to the sine of the angle between the lines of magnetic flux and a plane perpendicular to the longitudinal axis of the magnetometer. When the aircraft is level, the vertical component of the earth's magnetic field is perpendicular to the longitudinal axis of the magnetometer and produces no output. When the magnetometer is set to hold a west or east heading, its longitudinal axis is parallel to the aircraft's roll axis and the angular relation between the vertical field component and the magnetometer's longitudinal axis does not change with bank angle, and no output results. When the magnetometer is set to hold a north or south heading, however, its longitudinal axis is perpendicular to the roll axis of the aircraft and the vertical component of the earth's field produces an output proportional to the sine of the bank angle. In fact, the error introduced by the vertical field component is proportional to both the sine of the bank angle and the sine of the heading setting of the magnetometer. Hence, this invention includes a simple computer circuit for computing the product of the sine of the bank angle, the cosine of the heading setting of the magnetometer (zero at east) and the magnitude of the vertical component of the earth's magnetic field. This product signal is subtracted from the magnetometer output to give a correct signal.

DETAILEED DESCRIPTION OF THE INVENTION

This invention utilizes a magnetometer mounted directly to the structure of the aircraft. The magnetometer has a compass scale attached to it, and this assembly is free to rotate about an axis parallel to the aircraft's yaw axis, so that it can be manually adjusted by the pilot to the heading he desires to fly. This invention uses an electrical circuit to compensate for errors in the output of the magnetometer due to roll of the aircraft. This compensated magnetometer output can be used directly as a magnetic heading reference for a wing-leveler type of stability augmentation system, or for a more conventional automatic pilot system. It can also serve as a visual heading reference for a manually steered vehicle.

A brief description of a typical magnetometer heading reference and of the effect of a banked turn on its output follows.

Figure 1:
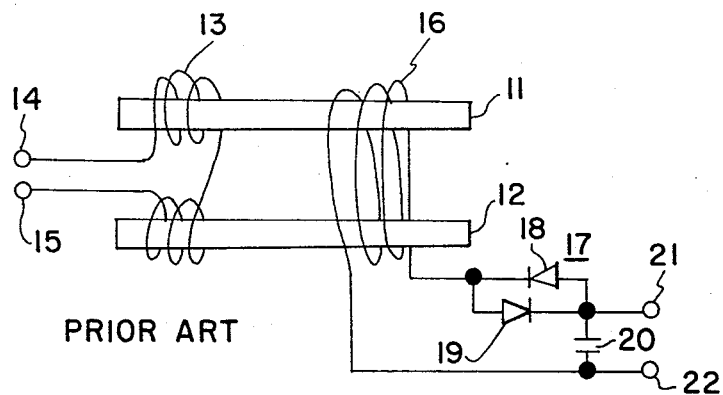
FIG. 1 is a schematic drawing of a prior art magnetometer that can be used in this invention.
Figure 2:
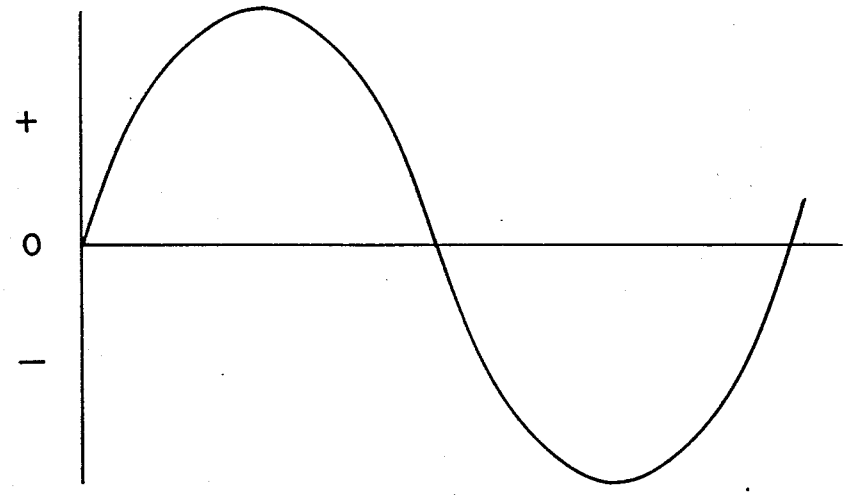
FIG. 2 is a drawing showing the outputs of the magnetometer shown in FIG. 1 for different positions of the magnetometer.
Figure 2:
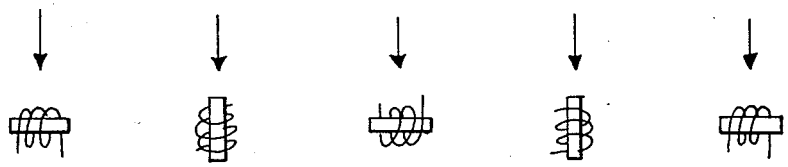

A conventional flux-gate magnetometer as shown in FIG. 1 is used to illustrate this invention, although any type of magnetometer with a similar directional characteristic can be used. The prior art magnetometer in FIG. 1 includes two highly permeable magnetic cores 11 and 12, a coil 13 that has an a.c. voltage applied to it across terminals 14 and 15, and a coil 16 connected to a demodulator 17 consisting of diodes 18 and 19, and a capacitor 20. The output of the magnetometer appears across terminals 21 and 22. The characteristics of this device are such that the d.c. output from the demodulator is zero when the direction of the earth's magnetic field is perpendicular to the longitudinal axis of the magnetometer. The output varies in a sinusoidal manner as the direction of the field with respect to the magnetometer is changed, reaching a maximum positive value when parallel to the longitudinal axis of the magnetometer in one orientation, and a maximum negative value in the opposite orientation as shown in FIG. 2. Rotation of the magnetometer about its longitudinal axis causes no change in the output.

Figure 3:
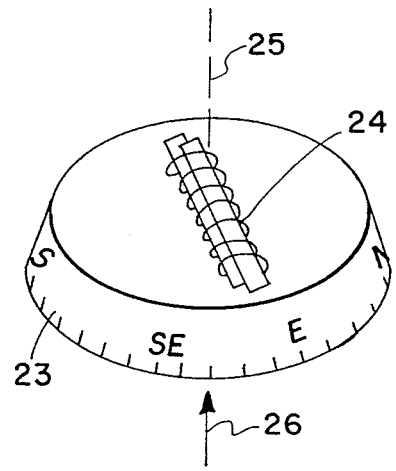
FIG. 3 is a schematic drawing showing how the magnetometer in FIG. 1 is mounted on an aircraft in accordance with the present invention.
Figure 4:
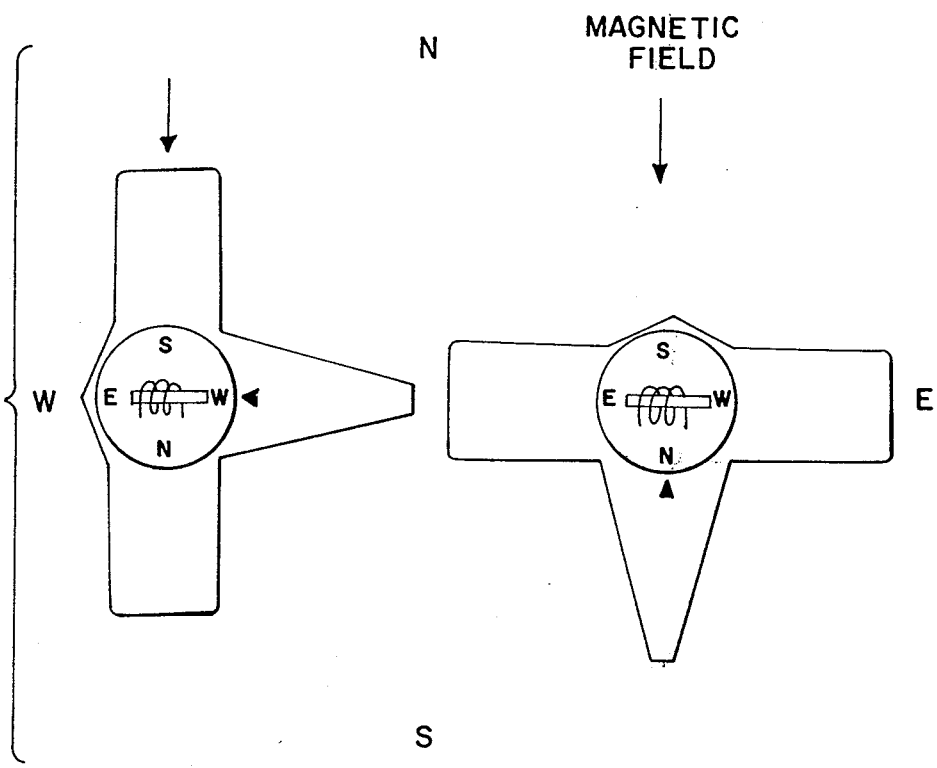
FIG. 4 is a schematic drawing showing how the magnetometer in FIG. 1 operates when attached to an aircraft in accordance with FIG. 3.

This type of magnetometer may be used as a heading reference for an aircraft or other vehicle by mounting it in the vehicle so that it may be rotated about an axis parallel to the yaw axis of the vehicle. A circular scale 23 calibrated in the points of the compass is attached to the magnetometer 24, so that is rotates with it about an axis 25 parallel to the yaw axis of the vehicle as shown in FIG. 3. A pointer, or index marker 26, is mounted adjacent to the scale, and is attached to the vehicle. The calibrations on the scale 23 are so related to the magnetometer, that when E or W is set opposite the index mark, the longitudinal axis of the magnetometer will be parallel to the fore-and-aft axis of the vehicle (the roll axis of an airplane). Now, if the pilot rotates the magnetometer to bring N opposite the index mark, the magnetometer will produce an output voltage of zero only when the vehicle is headed directly toward magnetic north or magnetic south in FIG. 2. As the slope of the voltage output of the magnetometer, as the vehicle passes through the north heading direction, is opposite from that when it passes through the south heading direction (FIG. 2), it can provide a stable control voltage to the vehicle's control system at only one of these two headings; and is, of course, connected so that the system is stable when the vehicle heading corresponds to the reading on the magnetometer scale. FIG. 4 shows, also, that the magnetometer gives a null output when its scale is set for W and the vehicle is headed west.

Figure 5:
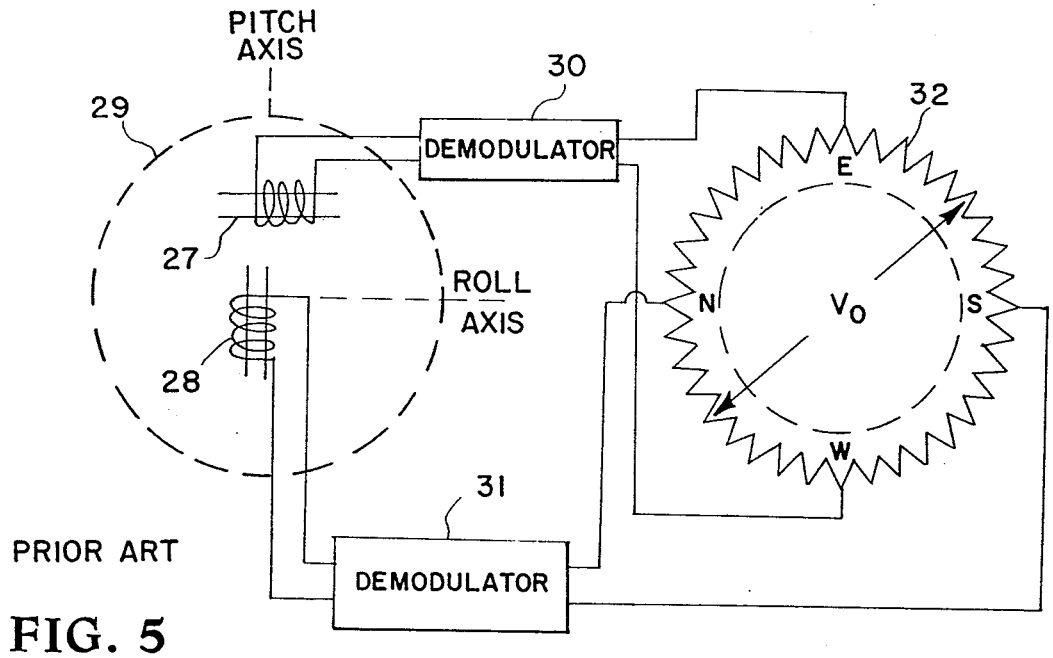
FIG. 5 shows a prior art embodiment of a heading reference using two of the magnetometers in FIG. 1 mounted in a remote location of an aircraft.

A more elaborate prior art arrangement is shown in FIG. 5. Here, two nonparallel magnetometers 27 and 28 are mounted in the vehicle parallel to the roll and pitch axis, respectively, generally in some remote location 29 where it would be inconvenient for the pilot to rotate them physically. The demodulated output voltages from demodulators 30 and 31 of the magnetometers are fed into a resolver 32 mounted on the instrument panel of the vehicle, so that the pilot can set the resolver to produce a null output at the desired heading.

Although either of the magnetometer arrangements in FIG. 3 or FIG. 5 can be used in this invention, the former is preferred because of its greater simplicity.

The major difficulty in using either of these arrangements as a heading reference for a vehicle control system lies in the fact that, in most areas, the earth's magnetic field is not horizontal, and the body-mounted magnetometer, for heading settings other than east or west, is sentitive to bank angle of the vehicle as well as vehicle heading.

Figure 6:
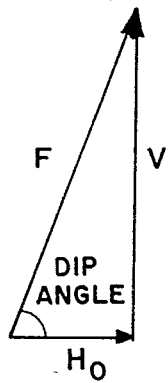
FIG. 6 is a vector diagram of the components of the earth's magnetic field.
Figure 7A:
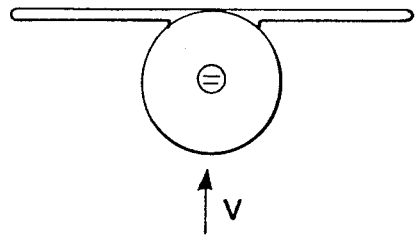
FIG. 7 a, b, c, d is a diagram illustrating the errors produced in the magnetometers shown in FIG. 1 caused by the vertical component of the earth's magnetic field.
Figure 7C:
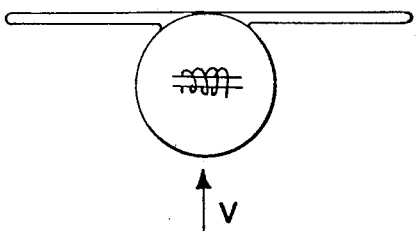
Figure 7B:
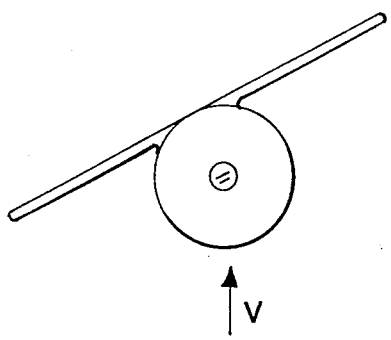
Figure 7D:
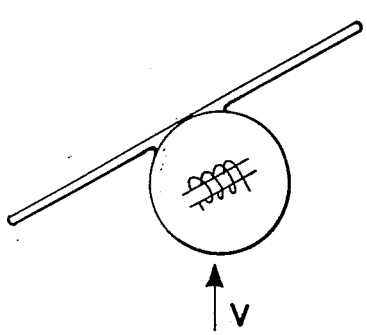

This effect can be seen by referring to FIGS. 6 and 7. The direction of the earth's magnetic field is indicated by the vector F (FIG. 6) and its horizontal and vertical components by $H_o$ and V. The FIGS. 7a, b, c and d show a section of an aircraft taken in a plane perpendicular to the roll axis and show a single magnetometer 24 mounted as described in FIG. 3. In FIG. 7a and b the magnetometer is set for an east or west course—that is, the longitudinal axis of the magnetometer is parallel to the roll axis of the aircraft. In this position the magnetometer is not sensitive to aircraft roll, since roll rotates it about its longitudinal axis. In FIG. 7c and d, however, the magnetometer is set for a north or south course, with its longitudinal axis perpendicular to aircraft roll axis, and it is obvious that changes in aircraft roll angle cause changes in the angle of the magnetometers longitudinal axis with respect to the vertical component of the earth's magnetic field, and thus produce an output from the magnetometer which is a function of roll angle as well as heading angle. When the output of this type of magnetometer is used to control the heading of an aircraft, no difficulty will be experienced for east or west headings. However, in the United States, for example, where the magnetic dip angle has a value of 60° to 75°, a southerly setting of the magnetometer would result in excessive negative feedback in the overall control system-that is, if the system called for a turn to the right to correct an error in course, the aircraft would start to bank to the right (right wing down), and the magnetometer would be influenced by the vertical component of the earth's magnetic field to produce a signal calling for a reduction in the turn. This would lead to very sluggish operation for southerly settings. More serious, a northerly setting will result in positive feedback of the overall system, so that if a turn is once started in either direction, the magnetometer will call for a continually increasing rate of turn in that direction regardless of the vehicle's heading.

A major feature of this invention is the computation of the magnitude of this output due to roll angle, and the subtraction of it from the gross output of the magnetometer, so that the remaining signal is a function of heading only. It can be seen from FIGS. 6 and 7 that the magnitude of the roll sensitive output of the magnetometer, R, can be represented by the equation:

$$R = K \sin \phi \cos H$$

where K is a gain factor which is a function of the local magnetic inclination angle and the magnetometer sensitivity, $\phi$ is the roll angle and H is the heading for which the magnetometer is set. Note that actual heading of the aircraft is not involved.

Figure 8:
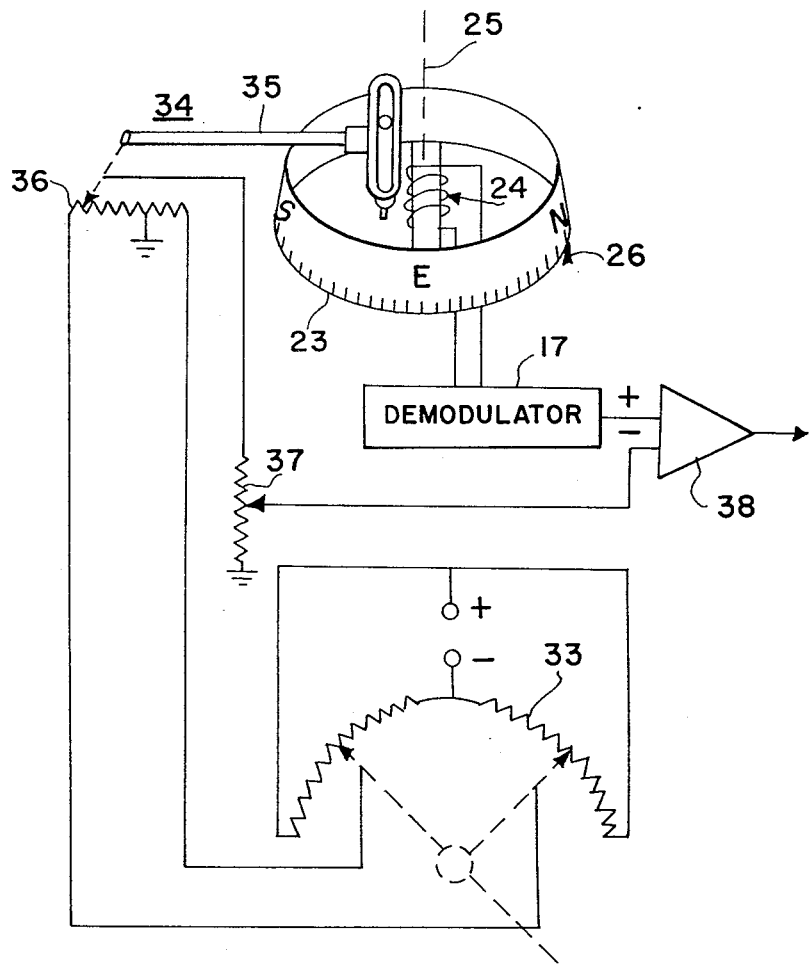
FIG. 8 is a schematic drawing of an embodiment of the present invention.

Application of the magnetometer and correction network to an actual aircraft control system depends, to some extent, on the related instrumentation available in the aircraft. FIG. 8 shows an application in which a voltage signal proportional to the sine of the bank angle can be obtained from a vertical free-gyromounted transducer 33, such as is used in a conventional "artificial horizon." The sine function can be obtained by using a nonlinear resistance element in a potentiometer transducer, by a nonlinear mechanical linkage between the gyro gimbal and the potentiometer or by other conventional means. Actually, in practice, it has been found that the sine function is not necessary, and satisfactory performance is had when the signal is simply a linear function of roll angle. The output of transducer 33 is applied to another transducer 34 which is positioned by the magnetometer assembly (shown in FIG. 3) in such a way that its output is a cosine function of the heading setting of the magnetometer. Transducer 34 is a "scotch yoke" linkage 35, driving a linear potentiometer 36, but other means of obtaining the cosine function may be used. As shown in FIG. 8, the output voltage from the sin $\phi$ transducer 33 furnishes the supply voltage for the cosine H transducer 34, so that the output of the cosine H transducer is the product of sin $\phi$ and cosine H. This output feeds through an adjustable attenuator or potentiometer 37 which allows the value of K to be set into the equation. This attenuator would not normally have to be readjusted except for large changes in magnetic dip angle due to operating the aircraft in widely different geographical areas.

The output of attenuator 37 is subtracted from the output of demodulator 17 by means of a differential amplifier 38 to provide the corrected output.

Figure 9:
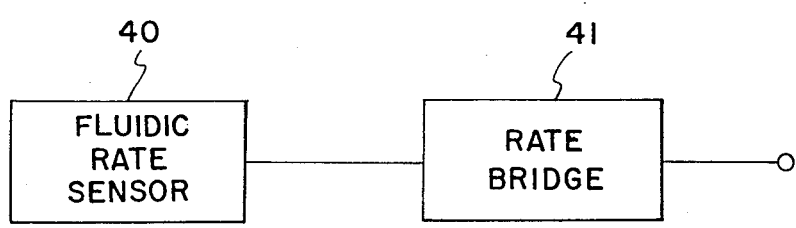
FIG. 9 is a schematic drawing of a preferred application of the present invention.

FIG. 9 shows a preferred application in which the magnetometer is used as a heading reference for a wing-leveler type of control system. The only sensor available in this system is a fluidic rate sensor 40 and rate bridge 41 which is sensitive, primarily, to rate of yaw of the aircraft. This is used in place of transducer 33 in FIG. 8.

For a properly banked turn, the sine of the bank angle is a function of vehicle velocity and rat of yaw:

$$\sin \phi = \sqrt{\frac{V\omega}{g^2 + V^2\omega^2}}$$

where $V$ is vehicle velocity, $\omega$ is the yawing rate of the vehicle and $g$ is the acceleration due to gravity. This function could be computed by the use of a suitable electronic network, but it has been found in practice that when a linear function of yaw rate is substituted for sine $\phi$ in the previously described correction network, the overall system performance is satisfactory within the normal range of vehicle velocities. This function of yaw rate is obtained from the rate sensor 40 whose output is applied through a rate bridge 41 to potenticmeter 36 in FIG. 8. It should be noted that with this arrangement, a complete lateral/directional autopilot can be built without the use of gyroscopes of any type.

Figure 10:
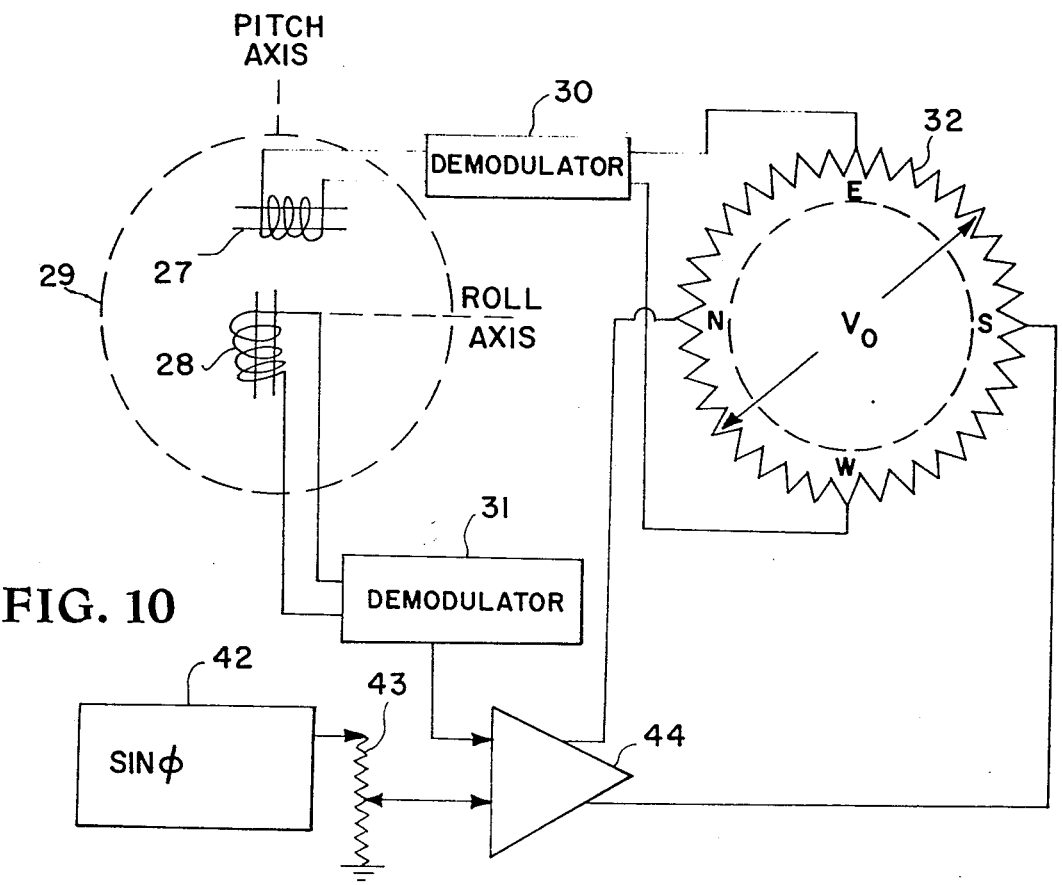
FIG. 10 is an embodiment of the present invention where the magnetometers are mounted in an aircraft remote to the pilot.

In the case where it is desired to mount the magnetometer unit in some remote location as described in connection with FIG. 5, a similar correction network can be applied. In this case, two magnetometers 27 and 28 in FIG. 10 are used in FIG. 5, the longitudinal axis of magnetometer 27 is positioned parallel with the roll axis of the vehicle and the longitudinal axis of magnetometer 28 is positioned parallel to the pitch axis. Referring to FIGS. 6 and 7, it is seen that magnetometer 27 will be unaffected by vehicle roll, while magnetometer 28 will experience a maximum error. It is only necessary, in this case, to apply a correction voltage proportional to vehicle roll angle or yawing rate to the output of magnetometer 28 to obtain a correct output for any course setting. Hence, a signal related to sin $\phi$ produced by a generator 42 is multiplied by K with the attenuator 43 and thus subtracted from the output of magnetometer 28 by means of a differential amplifier 44 with the resulting signal being applied to resolver 32. Generator 42 can be like the one in FIG. 8 or the one in FIG. 9.

Figure 11:
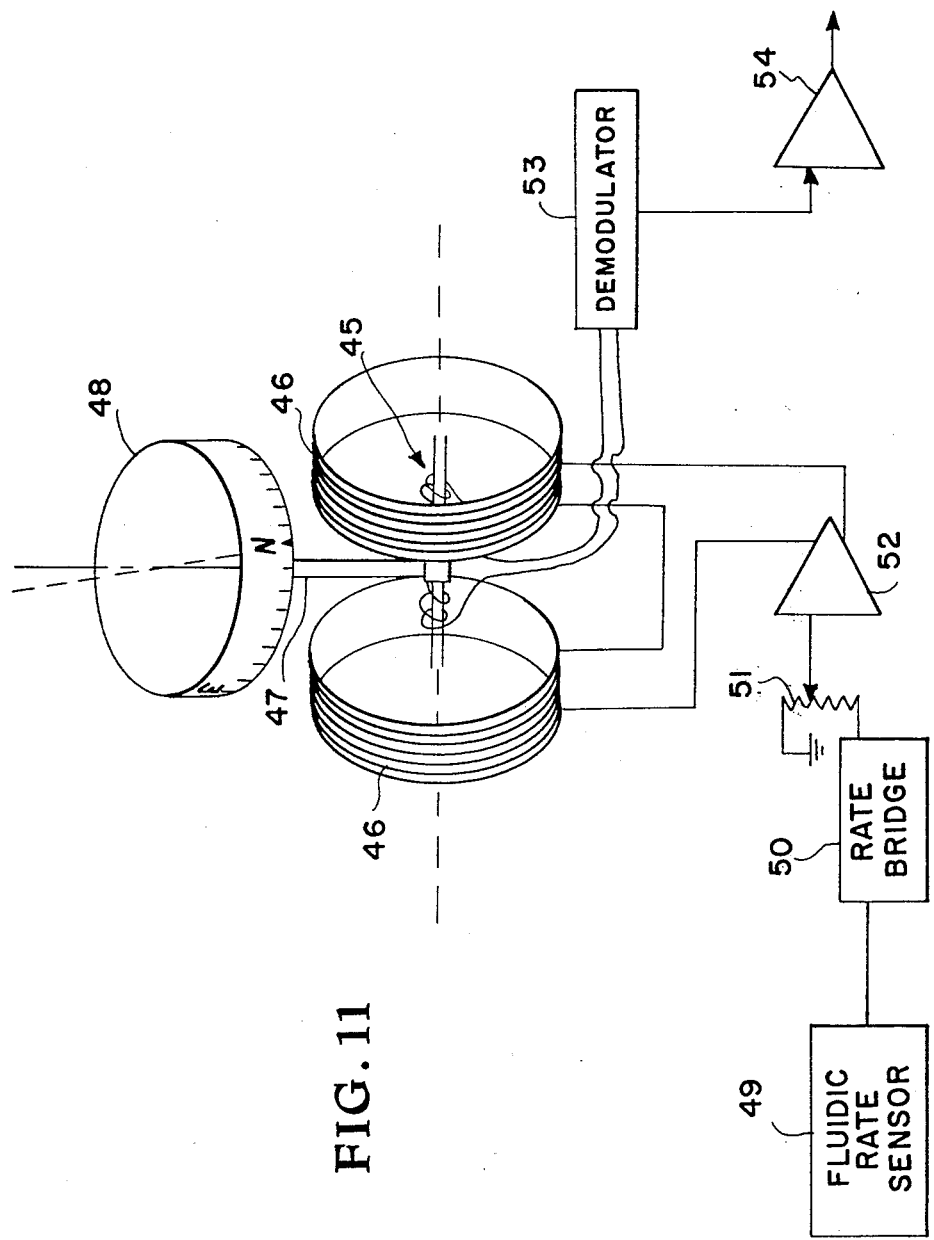
FIG. 11 is a schematic drawing of a further embodiment of this invention.

FIG. 11 shows another version of the correction network applieed to a single rotatable magnetometer 45. Operation is similar to that of FIG. 8, except that the correction is applied directly to the magnetometer as a variable, local magnetic field. A solenoid, made up of one or more coils 46 would on nonmagnetic forms, is positioned around the magnetometer in such a way that when an electrical current is passed through it, a relatively uniform magnetic field is generated within the space occupied by the magnetometer. The magnetometer is mechanically attached by a shaft 47 to a compass scale 48 which can be positioned by the pilot to select the desired heading of the vehicle as previously described. The magnetometer rotates within the solenoid coil which is fixed to the vehicle so that the direction of the magnetic field it generates is parallel to the pitch axis of the vehicle. A current is applied to the solenoid which is a function of the roll angle of the vehicle. FIG. 11 shows this function being supplied by a fluidic rate sensor 49 primarily sensitive to yaw rate as in FIG. 9. The output of sensor 49 is applied through a rate bridge 50, an attenuator 51 and an amplifier 52 to coils 46. It is evident that the effect of the field generated by the solenoid on the magnetometer is proportional to cosine $H$, where $H$ is the heading for which the magnetometer is set. The total correction applied to the magnetometer is, then $R = K \sin \phi \cosine H$, where sin $\phi$ is approximated by the output of the rate sensor, cosine $H$ is generated by the positioning of the magnetometer with respect to the direction of the field generated by the solenoid, and $K$ is set in by an attenuator 51 to correspond to the magnetic tilt angle of the geographic locality in which the vehicle operates. The output of magnetometer 45 is applied through demodulator 53 to an output amplifier 54. This configuration avoids the moving parts of the transducer and cosine generator as shown in FIGS. 8 and 9.

This invention also can be used to make corrections of the "northerly turning error" affecting conventional magnetic compasses used in the navigation of aircraft and other vehicles.

Figure 12:
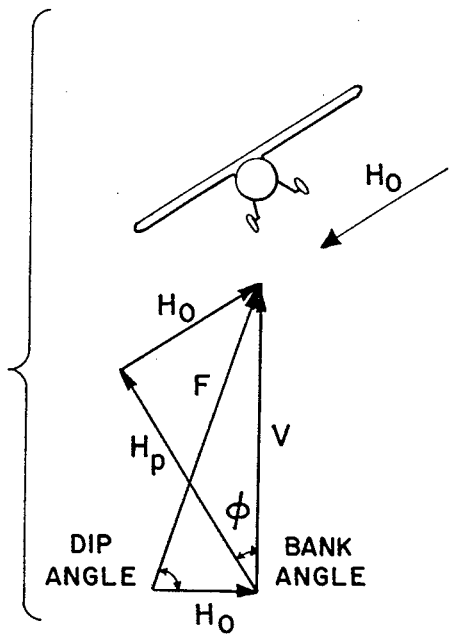
FIG. 12 is a vector diagram showing the earth's magnetic forces exerted on an aircraft while it is making a banked turn.

FIG. 12 shows the magnetic vectors involved. F represents the total magnitude of the earth's magnetic field at a particular location. H$o$, the horizontal component of F, provides the directional sense to the magnetic compass neeedle. In level flight, the vertical component, V, does not affect the compass, but when the aircraft banks, H$e$, the component of V parallel to the aircraft pitch axis, is sensed by the compass and introduces an error in its directional reading. This error, called the "northerly turning error," is great enough to cause completely erroneous readings when the aircraft makes a turn toward a northerly heading in the northern hemisphere.

The solution to this problem in traditional aircraft instrumentation has been to provide a directional gyroscope which is adjusted to give the same reading as the magnetic compass when the aircraft is in level flight. The directional gyroscope is then used as an azimuth reference during maneuvers. This solution requires the addition of an expensive gyroscope instrument of limited life which, because of its inherent drift, must be periodically re-set to correspond with the magnetic compass. The present invention corrects the northerly turning error inherent in the magnetic compass so that it will provide accurate azimuth readings during turning maneuvers and the directional gyroscope will no longer be needed.

It can be seen from FIG. 12 that if a magnetic field $Hc$, whose magnitude is equal to $He$ and whose direction is opposite to that of $He$, is applied to the magnetic compass needle, it will cancel the affect of V on the compass during a turning maneuver. It can also be seen that the direction of $Hc$ will be parallel to the pitch axis of the aircraft and its magnitude will be equal to $V \sin \phi$.

Figure 13:
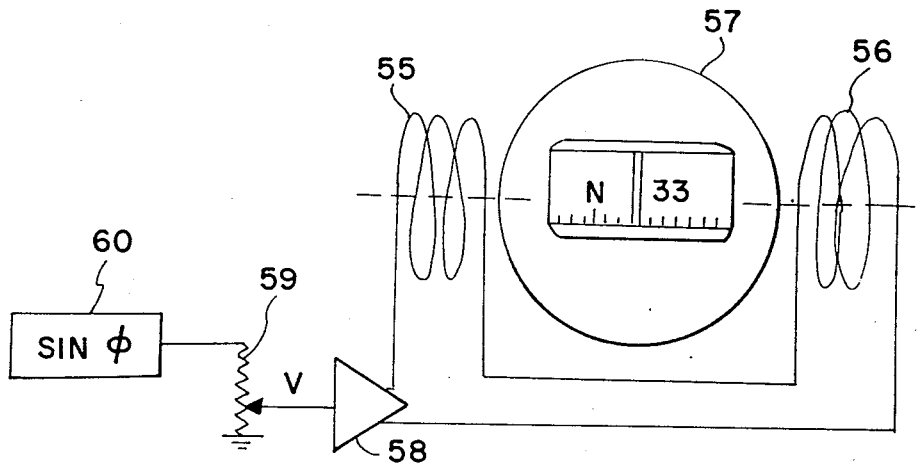
FIG. 13 is an embodiment of the invention correcting the northerly turning error of a magnetic compass on an aircraft.

A mechanization of this correction is shown in FIG. 13. A pair of solenoid coils 55 and 56 are mounted on either side of the magnetic compass 57. These coils are designed to generate a relatively uniform magnetic field in the space in which the magnetic compass needle rotates. The direction of this field is parallel to the pitch axis of the vehicle in which the compass is mounted. In operation, a current proportional to vehicle bank angle and to the vertical component of the earth's magnetic field flows through the solenoid coils. The magnitude and direction of this current is such that the magnetic field generated by the solenoid coils just cancels $He$. The appropriate current is generated by a power amplifier 58 receiving its input from an electrical pickoff on some instrument bank angle of the vehicle. The existing artificial horizon gyroscope would be an appropriate instrument.

Although a current proportional to $\sin \phi$ is required for perfect compensation, a current proportional to $\phi$ along provides adequate compensation in practice. As the magnitude of V varies very little over wide geographical areas, it can be set into the system manually, as with a potentiometer 59. The input to potentiometer 59 is produced by a generator 60 such as transducer 33 in FIG. 8 or rate sensor 40 in FIG. 9.

The advantages of this invention are that it provides a simple, economical and reliable vehicle heading reference that corrects for the northerly turning error.

Various changes can be made in the embodiments of the invention shown and described without departing from the invention. For example, different types of magnetometers can be used and different sine function generators can be used.

What is claimed is:
1. A vehicle heading reference comprising:
   a directional dial mounted on said vehicle so that it can be turned about an axis parallel to the yaw axis of said vehicle;
   a magnetometer mounted on said directional dial such that its longitudinal axis coincides with said axis parallel to the yaw axis of said vehicle so that it is rotatable with said directional dial wherein the magnetometer produces an output signal related to the difference between the directional dial setting and the actual heading of said vehicle;
   means on said vehicle for generating a signal related to the northerly turning error; and
   means for subtracting said signal related to the northerly turning error from said output signal produced by said magnetometer whereby the resulting signal is an output signal corrected for the northerly turning error.
2. A vehicle heading reference according to claim 1 wherein said means for generating a signal related to the northerly turning error is means for generating a signal related to

$$K \sin \phi \cos H$$

where $K$ is a gain factor which is a function of the local magnetic inclination angle and the magnetometer sensitivity, $\phi$ is the roll angle and $H$ is the heading for which the magnetometer is set.

3. A vehicle heading reference according to claim 2 wherein the $\sin \phi$ portion of said signal related to $K \sin \phi \cos H$ is generated by a vertical free-gyro-mounted transducer.

4. A vehicle heading reference according to claim 2 wherein the $\sin \phi$ portion of said signal related to $K \sin \phi \cos H$ is generated by a fluidic yaw rate sensor.

5. A vehicle heading reference according to claim 2 wherein the $\cos H$ portion of said signal related to $K \sin \phi \cos H$ is generated by coils that surround said magnetometer and fixed to said vehicle so that the direction of the magnetic field generated by the coils is parallel to the pitch axis of the vehicle.

6. A vehicle heading reference according to claim 2 wherein the $\cos H$ portion of said signal related to $K \sin \phi \cos H$ is generated by a scotch yoke fixed to said magnetometer.

* * * * *